Figure 3:
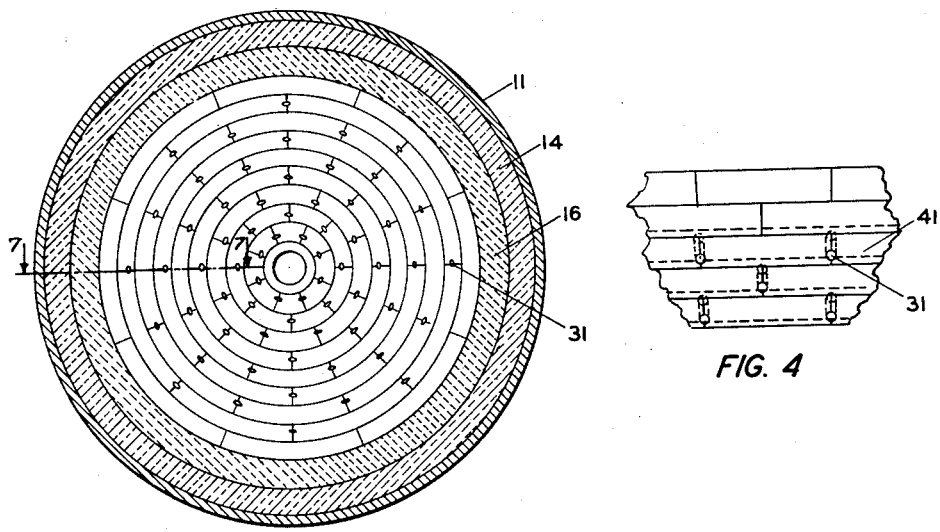

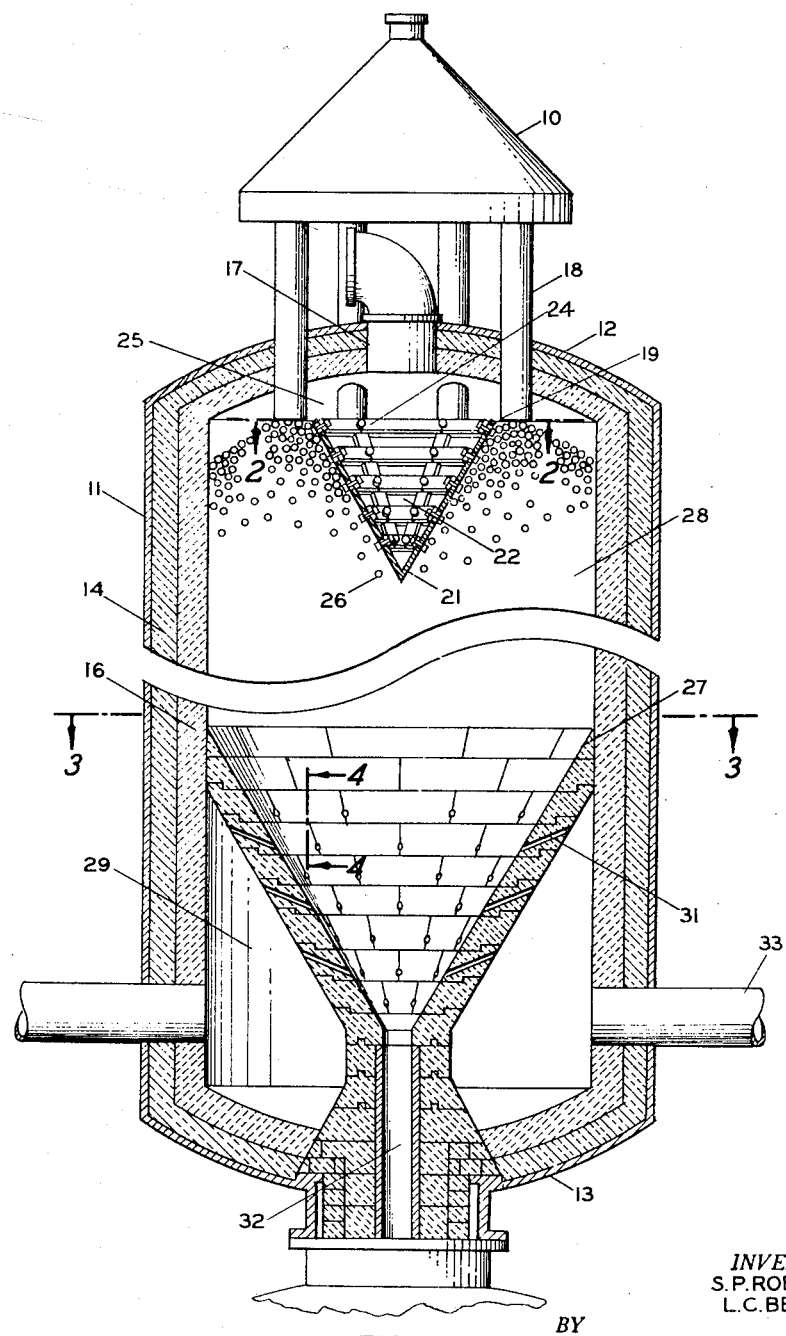
FIG. I
INVENTORS
S. P. ROBINSON
L. C. BEARER
BY
Hudson and Young
ATTORNEYS Nov. 21, 1950    S. P. ROBINSON ET AL    2,530,731
PEBBLE HEATING CHAMBER Filed April 5, 1948    3 Sheets-Sheet 2

INVENTORS
S.P. ROBINSON
L.C. BEARER
BY
*Hudson and Young*
ATTORNEYS

Nov. 21, 1950    S. P. ROBINSON ET AL    2,530,731
PEBBLE HEATING CHAMBER

Filed April 5, 1948    3 Sheets-Sheet 3

INVENTOR.
S. P. ROBINSON
L. C. BEARER
BY
ATTORNEYS

Patented Nov. 21, 1950

2,530,731

UNITED STATES PATENT OFFICE 2,530,731

PEBBLE HEATING CHAMBER

Sam P. Robinson and Louis C. Bearer, Bartlesville, Okla., assignors to Phillips Petroleum Company, a corporation of Delaware Application April 5, 1948, Serial No. 19,114

9 Claims. (Cl. 263—19)

This invention relates to pebble heater apparatus. In one aspect this invention relates to pebble heating chambers in pebble heating apparatus. In another specific aspect this invention relates to a process and an apparatus for effecting contact between fluids and solid particulate contact materials. In a more specific aspect this invention relates to a process and an apparatus for contacting in a first heat transfer step a hot gas in countercurrent flow with a downwardly moving contiguous, compact mass of pebbles for transfer of heat from the pebble mass to a specific utilization in a second heat transfer step.

Apparatus generally used in contacting a moving contiguous mass of solid refractory contact material with hot gases in a first heat transfer step and for utilizing the moving bed of heated refractory material as a heat transfer medium in a second heat transfer step to supply heat to fluids in direct contact therewith is called pebble heating apparatus. Utilization of pebble heating apparatus is applicable and advantageous in various processes such as hydrocarbon conversion, gas absorption, and gas-solid heat exchange in general.

A principal use of pebble heating apparatus is in the conversion of hydrocarbons, involving thermal or catalytic processes such as cracking, hydrogenation, dehydrogenation, isomerization, polymerization, oxidation and the like.

The term "pebble" as used herein refers to the small, pebble-like, solid, refractory elements comprising the contact mass most generally used in pebble heating apparatus. Pebbles so used are preferably substantially spherical and relatively uniform in size, and in some instances they may be rod shaped or irregular in size. Spheres of about ⅛" to 1" in diameter function desirably, and those of about ¼" to ½" are most practical. Pebbles as used herein comprise any solid refractory material of flowable form, size, and strength suitable for carrying heat for transfer to gases in contact therewith. Pebbles comprising beryllia, alumina, zirconia, mullite, and periclase, for example, make excellent contact material for most processes. Metal balls such as nickel, "Monel," "Inconel," iron, etc., have utility in specific processes. Pebbles and/or pebble surfaces may be catalytically active or inert to gases in contact therewith, depending on the specific process. For example, in non-catalytic cracking the requisite is heat transfer and an inert contact mass having a high heat carrying capacity for transfer of heat to the gas in contact therewith is preferable. On the other hand, a catalytic gas conversion reaction would require the presence of a catalyst in which case at least the pebble surface should comprise the specific catalytic material needed.

Conventional pebble heating apparatus usually comprises a series of at least two chambers positioned substantially in vertical alignment with each other. The top and bottom chambers are referred to respectively as the pebble heating chamber and the gas contacting or, more preferably herein, the gas reaction chamber. A combustion chamber is positioned adjacent or in close proximity to the sides of the lower portion of the heating chamber. Hot gas from the combustion chamber is injected through the sides of the pebble heating chamber and passed therein countercurrently in contact with the downflowing contiguous mass of pebbles. Hot gases so utilized usually comprise combustion or flue gases produced in the combustion chamber, from the complete burning of a combustible gas. However, if desired, hot gas can be supplied to the pebble heating chamber from a source external to the pebble heating apparatus. Hot gas in contact with a pebble mass transfers heat thereto in a first heat transfer step. Effluent gas from the pebble heating chamber having transferred heat to the pebbles is relatively cool and is passed through the upper portion of the chamber to the stack. Pebbles thus heated in a first heat transfer step are passed downwardly from the pebble heating chamber through a conduit commonly called the pebble throat to the gas reaction chamber and are contacted therein in countercurrent flow with the upwardly flowing feed gases in a second heat transfer step. Effluent gas from the gas reaction chamber is passed from the top portion thereof. Pebbles, relatively cool subsequent to the transferring of heat to the feed gas, are passed from the gas reaction chamber and are recycled to the inlet of the pebble heating chamber. In some instances, the pebbles require periodic regeneration which may be conducted in a step intermediate the exit flow of pebbles from the gas reaction chamber and their recycle. Preferably, however, since the function of the regeneration step is usually to remove carbonaceous matter from the pebble surfaces, the regeneration is more often conducted in the pebble heating chamber in the presence of air introduced to the pebble heating chamber along with hot gases.

In pebble heater apparatus of one conventional design, the pebble heating chamber, substantially vertical and cylindrical, is provided with a single pebble inlet conduit positioned axially in the top closure member thereof and with a single axially positioned pebble throat. Pebbles flow into the chamber through the pebble inlet conduit to form a mass or bed of pebbles which takes a natural angle of repose, causing the upper surface of the pebble bed to take the general form of a cone with the apex in the pebble inlet.

The downward cross sectional flow of pebbles, although substantially uniform in the upper portion of the chamber, is non-uniform in the lower portion thereof, being slower along and near the periphery as the moving mass approaches the pebble throat. Such an occurrence of varying downward flow of pebbles in the pebble mass is manifest in the substantially stagnant portions of the pebble mass adjacent the pebble throat and extending upward into the pebble mass within an angle commonly referred to as the angle of slip, which is usually in the range of 60–70° with the horizontal and which has its vertex at the inlet to the pebble throat. Such retarded pebble flow results from friction between the pebble mass and the walls of the chamber. The head of pebbles above the angle is sufficient to overcome pebble friction as above described, and hence, the mass above the angle is capable of flow. The surface along the imaginary upper side of the angle represents a line of cleavage along which slipping occurs, i. e., within the angle, pebble friction is sufficient to form the relatively stagnant portion and above the angle the pebble friction is overcome. It is because of such a line of slippage, that the angle so described is commonly referred to as the line of slip.

In some instances, such stagnant zones in the pebble heating chamber are packed at least partially with an inert filler material since there is little advantage to be gained from the presence of pebbles therein. However, more often such stagnant zones comprise a portion of the pebble contact mass containing pebbles which substantially do not participate in any of the heat transfer steps in the pebble heating apparatus. Although pebbles, when present in such relatively stagnant zones, absorb heat from the hot flue gases in contact therewith, they become ineffective in that regard by virtue of their substantially permanent residence in the chamber whereby they lose very little of their heat and thus receive very little heat from the hot gases passing upwardly therethrough. In either case, the pebble mass which participates in the heat transfer lies above the angle of slip and has an inverted cone shaped bottom surface, thereby taking the general shape of a modified cylinder having a conical top and a funnel shaped bottom.

In such a pebble mass the vertical paths of the upwardly flowing hot gases in contact with the pebble mass are shortest along the peripheral zones thereof and longest along the axial zones and vary proportionately between those extremes. Hot flue gases are often introduced to the pebble heating chamber through a plurality of points and pass upwardly through the pebble mass at a uniform rate of cross sectional flow. However, hot gases flowing upwardly through the pebble mass have non-uniform conditions of contact time therewith. Hot gases flowing upwardly through the periphery of the pebble mass do so at a time of contact shorter than when flowing upwardly through the central zone of the pebble mass, and when the hot gases traverse intermediate vertical paths, the contact time varies proportionately.

Since the major proportion of the hot flue gas introduced to the conventional pebble heating chamber traverses the shorter vertical paths, less heat is transferred to the pebble mass per unit volume of hot gas than would be transferred thereto if contact time between the hot gases and the pebble mass were uniform throughout the chamber. Consequently, hot gases introduced to the pebble heating chamber are inefficiently utilized and the effluent gases leave the heating chamber at temperatures higher than necessary or economically desirable, and carry away a considerable amount of heat which could have been imparted to cooler pebbles in the central portion of the pebble heating chamber. Concomitant with the varied conditions of contact time throughout the pebble heating chamber is an exit flow therefrom of non-uniformly heated contact mass through the pebble throat to the gas reaction chamber. Such a condition is most undesirable since an unevenly heated pebble mass entering the gas reaction chamber causes an uneven reaction of gases therein whereby underreacting of said gases takes place in some portions of the reaction chamber and overreacting progresses in other portions thereof. The net result is an abnormally low overall product yield and conversion efficiency.

This invention concerns a pebble heating chamber which provides for a uniform cross sectional flow of downwardly moving pebbles, for an efficient utilization of hot flue gases as a heat transfer medium, for uniform conditions of contact time between hot gases and the pebble mass, and for a uniformly heated pebble mass for utilization in a second heat transfer step, which is usually conducted in the gas reaction chamber subjacent thereto.

An object of this invention is to provide an improved process and apparatus for heating pebbles in a pebble heating apparatus.

Another object is to provide an apparatus for maintaining a more uniform time of contact between hot gases and pebbles in a pebble heating chamber.

Another object is to provide an apparatus effecting a more efficient transfer of heat from a stream of upwardly flowing hot gases in countercurrent flow with a moving contact mass of pebbles in a pebble heating apparatus.

Another object is to provide an even flow of pebbles through a pebble heating chamber in a pebble heating apparatus.

It is still another object to provide a uniformly heated pebble mass for utilization in a second heat transfer step in a pebble heating apparatus.

It is yet another object to provide a means of increasing the pebble heating capacity of a pebble heating chamber by more than two-fold.

Other objects will become more apparent to one skilled in the art from the accompanying discussion and disclosure.

In accordance with this invention, an improved pebble heating chamber is provided having a single effluent gas outlet and a plurality of pebble inlets, each positioned in the top closure member, an inverted perforated cone having an adjustable perforate area in its walls and positioned in spaced relation with the pebble inlets and effluent gas outlet so as to control effluent gas flow, and an inverted perforate conical gas distribution member closing the chamber intermediate its ends to provide a pebble heating zone thereabove and a combustion zone therebelow and serving to support, at least partially, the pebble contact mass. Gas inlet means are provided through the walls of the combustion zone. To understand more fully the nature of the invention reference may be had to the attached drawings which diagrammatically illustrate this invention.

Figure 4:
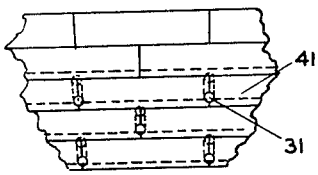
Figure 2:
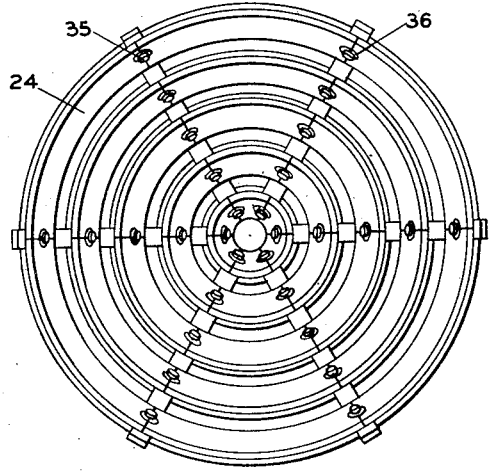
Figure 5:
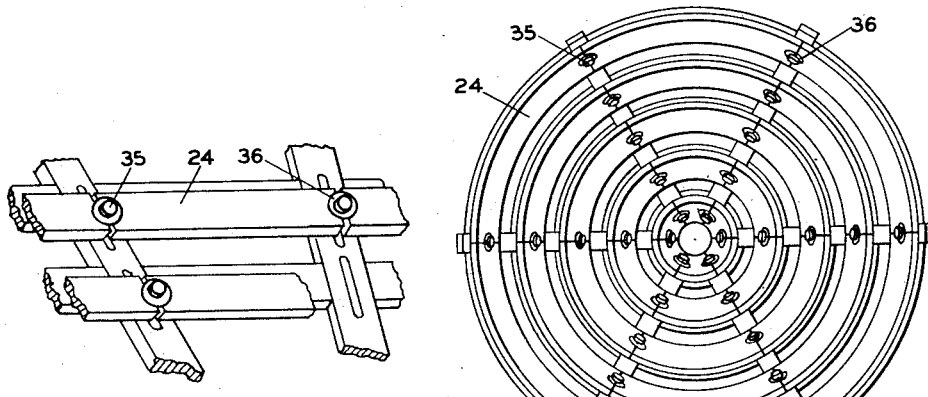
Figure 6:
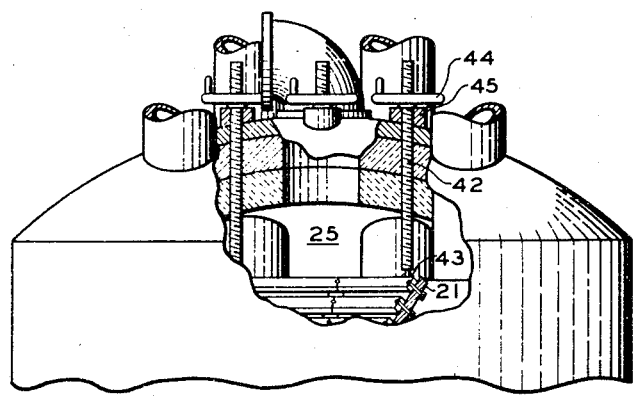
Figure 7:
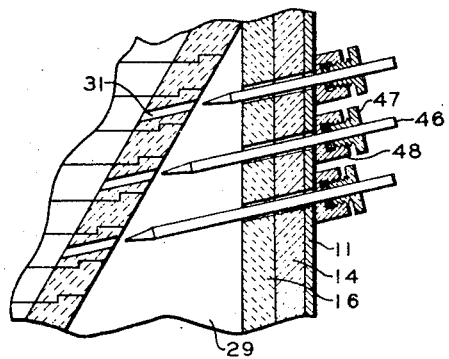

Figure 1 is a sectional elevation of the preferred form of our apparatus and shows a preferred method of supporting the conical gas distribution and pebble bed support member. Figure 2 is a plan of section 2—2 of Figure 1. Figure 3 is a plan of section 3—3 of Figure 1. Figure 4 is an elevational view of section 4—4 of the pebble passageways of Figure 1. These passageways are directed inwardly and downwardly toward the axis of the conical member. Figure 5 illustrates a preferred means for slidably adjusting the perforate area of the inverted perforate cone of Figure 2. Figure 6 is an enlarged cutaway view of the upper part of Figure 1, illustrating means for movably attaching the conical gas distribution member of Figure 1 to the top closure member of the pebble heating chamber illustrated therein. Figure 7 is a sectional view taken along the line 7—7 of Figure 3, illustrating means for adjusting the perforate area of the pebble bed support member of Figure 1.

Referring now to the drawings, and particularly to Figure 1, shell 11 is preferably an unbroken cylinder which is closed at its ends by closure members 12 and 13. Chamber 10 is a pebble surge bin and distributor. Shell 11 is lined interiorly with layers of insulating materials such as common refractory 14 and superrefractory material 16. Common refractory materials may include block insulation, insulating fire brick, and fire clay brick or layers of any two or more of them. Superrefractory materials 16 may include silicon carbide. mullite or alumina, or any other suitable refractory having physical and chemical properties which give sufficient strength to withstand heavy loads and high temperatures with substantially no breakage or deterioration. Layers of common refractory and superrefractory also are provided to insulate the bottom of shell 11. Effluent gas outlet 17 is positioned axially in closure member 12. A plurality of pebble inlet means 18 are positioned in member 12 concentrically about the axis of shell 11 and extend through member 12 a short but substantial distance, terminating at 19. A perforate inverted conical baffle member 21 may be positioned axially below gas outlet 17 within a circle described by pebble inlet conduits 18 extending through member 12. Conical baffle member 21 is perforate at a plurality of points 22 and is spaced within the circle of pebble inlets apart from effluent gas outlet 17 so as to permit the entire flow of gas around itself and/or therethrough and to avoid the flow of pebbles thereinto from conduits 18. Adjustable closure means 24 shown in Figure 5, is the preferred arrangement for regulating the perforate area of conical member 21. For example member 24 is adjacent the interior wall of member 21 and slidably fixed thereto at fastening means 35 and 36. Member 24 in a closed position fits the contour of the wall of member 21 and in such a position closes opening 22 completely. By moving member 24 to an open position, the effective area of opening 21 is progressively increased. By so moving member 24, the effective area of openings 22 is adjusted to any desired degree. A plurality of adjusting means 24 provides for control of the effective area of openings 22 in a plurality of zones of the walls of member 21, and thereby for adjusting any selected portion of the perforate area of member 21 to any desired degree. If desired, member 24 can be adapted to similarly function when slidably affixed to the extension wall of member 21. Space 25 allows passage of effluent gas around member 21. The flow of gas through space 25 varies in accordance with the extent to which the perforate area of points 22 is reduced. An adjustable sliding means similar to that of Figure 5 can be utilized for controlling the area of opening 25. However, a sliding means by which member 21 can be moved in a vertical direction is preferable. Perhaps a most satisfactory means for adjusting the area of opening 25 would be to manually place member 21 in a desired stationary position. Conical member 21 may be supported by pebble inlet conduits within chamber 28 at points 19 or in close proximity thereto or can be supported by rigid supports within chamber 28 fastened at one end to the inner walls thereof. The positioned conical member 21 can be movably adjusted to regulate the size of opening 25, when desired. One such an embodiment is shown in Figure 6, where conical member 21 is movably supported by means of positioning rods or lifting screws 42, rigidly attached to conical member 21 at points 43, and supportingly engaged with internally threaded drive wheels or lifting nuts 44. Each drive wheel 44 is supported on a bearing block 45 rigidly attached to the outer wall of closure member 12, so that when wheels 44 are turned, lifting screws 42 are raised or lowered, as the case may be, and conical member 21 is moved in a vertical direction. The base of conical member 21 is shown preferably to be fixed to pebble inlet conduits 18 at 19. However, it is to be understood that the positions of pebble inlet condits 18 in chamber 28 and of the base of conical member 21 are irrelevant so long as member 21 is axially within said circle of the pebble inlets, being positioned thereby so as to avoid the flow of pebbles thereinto. The apex angle of conical baffle member 21 is necessarily of a value such that pebbles in tending to form a natural angle of repose do not form a void space subjacent member 21.

Inverted perforate conical member 27 is made of superrefractory material and is positioned intermediate the closure members 12 and 13 of shell 11 to form pebble heating chamber 28 thereabove and combustion chamber 29 therebelow. Combustible or hot gases are admitted to chamber 29 through gas inlet conduits 33. A plurality of gas passageways 31 in the walls of conical member 27 are positioned as illustrated in detail in Figures 3 and 4. Passageways 31 lead through the wall of member 27 from combustion chamber 29 in a downward and inward direction to heating chamber 28. Passageways 31 in conical member 27 are formed by virtue of refractory bricks 41, Figure 4, having grooved sides so that, when fitted with adjacent bricks, the grooves form communications or openings 31 extending downwardly and inwardly from combustion chamber 29 to pebble heating chamber 28. Hot gases introduced to combustion chamber 29, or flue gases from the combustion of combustible gases therein are passed through openings 31 to the lower part of pebble mass 26 which moves in its entirety through conical member 27 toward the apex thereof to enter pebble throat 32 for passage to the gas reaction chamber below. Hot gas or combustible gas mixed with air is admitted to the combustion chamber 29 through burners 33. Pebble throat 32 is axially adjacent conical member 27 at the apex, is made preferably of superrefractory material and is in direct communication with pebble bed 26. The exit moving contiguous and compact pebble mass passes through throat 32 to a gas reaction chamber below (not shown).

The diameter of each opening 31 is sufficiently large to permit a free flow of hot gases therethrough. In view of the downward and inward projection of openings 31, it is possible to utilize large openings for passing hot gases to pebble bed 26 without danger of pebbles clogging or escaping through the openings.

Openings 31 can be further utilized for effecting improved flow conditions of hot gases to pebble mass 26 by adjusting the effective diameters thereof to accentuate the flow of hot gases into a preferred zone of member 27. For example, ceramic rods of proper shape to serve as valves may be inserted in one or more openings and may even extend through the outer walls 11, 12, and 13 to provide for such control from the outside. This can be done, as shown in Figure 7, by means of tapered ceramic rods 46, each axially disposed with respect to a passageway 31 and extending into chamber 29 through shell 11, terminating at a point in close proximity to, or within the passageway 31 as desired. The selected axial position of a rod 46, i. e., whether the rod terminates at a point outside the corresponding passageway, or at a predetermined point within the passageway, thus determines the flow of gas through that passageway. A rod 46 is moved in an axial direction through a packing gland comprising a follower 47 engaged with housing 48 which is rigidly attached to steel shell 11 on its outer wall and axially aligned with respect to a passageway 31, so that the rod 46 can be supported in any desired axial position with respect to that passageway. Preferably, however, openings 31 are adjusted manually as desired.

Introduction of hot contact gases to chamber 28 through conduits 31 provides for intimate contact of fresh hot gases with the exit flowing pebble mass in a relatively constricted zone. Such a feature is advantageous since the full flow of incoming hot gas is in intimate contact with a relatively small volume of exit flowing pebbles previously heated in the main body of the chamber. Such a final heating insures the delivery of a uniformly heated pebble mass at the desired maximum temperature level to the pebble throat.

The apex angle of the conical support member 27 is in the range of 55 to 75° and lies above the potential angle of slip of the pebble mass, and avoids thereby the occurrence of a stagnant pebble zone therein. Hot flue gases enter chamber 28 downwardly through conduits 31 and must thereby necessarily reverse their direction in order to pass upwardly through the mass. Similarly, hot gases leaving the interior surface of member 27 pass upwardly into chamber 28 and cross paths with the downward moving pebble mass. In view of the arrangement of openings 31 in conical member 27 and of the absence of stagnant zones in the pebble mass 26, the paths of hot contact gases and downwardly moving pebbles cross a large number of times providing thereby for uniform conditions of contact time and heat transfer between the hot gases and pebbles throughout the entire chamber.

Pebbles entering chamber 28 through conduits 18 have a tendency to form individual piles of fresh moving pebbles therein, taking a natural angle of repose of about 30°. Without the presence of baffle member 21, a pebble mass thus formed would flow very non-uniformly downward in the chamber and would tend to flow much faster in the center of the chamber, thereby forming relatively stagnant zones of pebble flow in the peripheral portions of the chamber. Such an occurrence is responsible for non-uniform heat transfer and consequent inefficient utilization of hot contact gases. Perforate conical member 21 distorts such an usual flow path of pebbles to cause the mass to move downward and along the walls of the chamber. The apex of member 21 can be as great as 100°, although we prefer an angle in the range of 60 to 70°, since under those conditions the flow pattern is more efficiently altered to direct the moving pebbles downward and along the walls of the chamber.

A further advantage of our invention lies in the versatility of members 27 and 21 for altering the course of hot upwardly flowing gases through the mass. The apparatus provides for altering in any way desired the flow of hot gases from combustion chamber 29 to pebble mass 26 and adjusting the effective diameter of one or more of openings 31 as described hereinbefore. In addition, the direction of upward flow of hot gases can be corrected if desired by altering all or any part of the perforate area of openings 21 and by altering space 25 as described hereinbefore.

In conventional pebble heating apparatus the stagnant zone in the pebble mass comprises over one-half the total contact zone. Our apparatus by virtue of the absence of stagnant zones in the pebble bed provides pebble heating capacity exceeding by over 100 per cent that of conventionally designed apparatus.

As compared to apparatus of conventional design, our apparatus provides for a more uniform heating of the pebble mass, greater pebble heating capacity, a more efficient utilization of the hot contacting gases, and for a greater control over the operation of the pebble heating chamber.

As will be evident to those skilled in the art, various modifications can be made for followed in the light of the foregoing disclosure and discussion without departing from the spirit and scope of the disclosure or from the scope of the claims.

We claim:

1. In a pebble heating apparatus utilizing a moving bed of heated pebbles, an improved heating chamber comprising a substantially vertically disposed closed outer shell, an effluent gas outlet conduit axially positioned in the top closure member of said chamber, a plurality of pebble inlet conduits concentrically positioned about said top closure member and extending therethrough a short but substantial distance, a perforate inverted conical member co-axial with said chamber and within said pebble inlet conduits, said conical member being movably attached to said top closure member and spaced therefrom at a sufficient distance to allow the passage of gas therebetween, adjustable closure means adapted to regulate the perforate area of said conical member, an inverted perforate conical gas distribution member transversely closing said chamber intermediate the ends thereof and dividing said chamber into a heating zone thereabove and a combustion zone therebelow, a pebble outlet conduit extending downwardly from the apex of said conical gas distribution member, at least one gas inlet conduit in communication with said combustion zone, the perforate portion of said perforate gas distribution member comprising a plurality of passageways slanting inwardly and downwardly in communication with said heating zone, and means for adjusting the perforate area of said gas distribution member.

2. In a pebble heating apparatus utilizing a moving bed of heated pebbles, an improved heating chamber comprising a substantially vertically disposed outer shell, insulating means within and adapted to insulate said shell, effluent gas outlet means in the upper portion of said chamber, pebble inlet means in the upper portion of said chamber, a perforate inverted conical member transversely closing said chamber intermediate the ends thereof and dividing said chamber into a heating zone thereabove and a combustion zone therebelow, the perforate portion of said perforate member comprising a plurality of gas passageways slanting inwardly and downwardly in communication with said heating zone, means for adjusting the capacity of said plurality of passageways, a pebble outlet conduit extending downwardly from a lower portion of said conical member, and gas inlet means to said combustion zone.

3. In a pebble heating apparatus utilizing a moving bed of heated pebbles, an improved heating chamber comprising a substantially vertically disposed closed outer shell, insulating means within and adapted to insulate said shell, an effluent gas outlet conduit axially positioned in the top closure member of said chamber, a plurality of pebble inlet conduits concentrically positioned about the top closure member of said chamber and extending therethrough into said chamber a substantial but short distance, a perforate inverted conical member axially positioned in said chamber within an imaginary circle described by the locus of said plurality of pebble inlet conduits extending into said chamber, said conical member being movably attached to the upper portion of said chamber and spaced from the top closure member thereof at a sufficient distance to allow the passage of gas therebetween, adjustable closure means adapted to regulate the perforate area of said conical member, a pebble outlet means in communication with pebbles in said chamber, and gas inlet means to said pebbles.

4. In a process for effecting contact of an upwardly flowing gas and a downwardly flowing contiguous mass of pebbles, the improvement comprising maintaining an axially positioned depression in the top surface of said pebble mass, the shape of said depression simulating an inverted cone having an apex angle of less than 120°, introducing said gas to the lower portion of said mass of pebbles along a locus simulating an inverse cone having an apex angle in the range of 55 to 75° preventing thereby the formation of stagnant zones in the remaining portion of the moving mass, said introduction being at a plurality of points along said locus in a downwardly slanting direction.

5. The apparatus in accordance with claim 1 wherein said adjustable closure means comprises a plurality of closure members each slidably fixed to and adjacent the wall of said perforate conical member in such manner as to entirely close a portion of said perforate area when in closed position and to entirely open said portion when in an open position, whereby any selected portion of the total perforate area may be progressively altered by slidably moving at least one of said closure members to cover any given portion thereof a desired degree.

6. The apparatus of claim 1 wherein said means for adjusting the perforate area of said gas distribution member, comprises at least one of said passageways and a rod member therefor, such a passageway being adapted to accept one such rod member whereby the flow of gas through such a passageway is decreased in an amount proportionate to the obstruction of said passageway by said rod member inserted therein.

7. In a pebble heating apparatus utilizing a moving bed of heated pebbles, an improved heating chamber comprising a substantially vertically disposed closed outer shell, an effluent gas outlet conduit axially positioned in the top closure member of said chamber, a plurality of pebble inlet conduits concentrically positioned about said top closure member and extending therethrough, a perforate inverted conical member coaxial with said chamber and within an imaginary circle described by the locus of said concentrically positioned inlet conduits, said conical member being spaced from said top closure member at a distance to permit the passage of gas therebetween, adjustable closure means adapted to regulate the perforate area of said conical member, an inverted perforate conical gas distribution member transversely closing said chamber intermediate the ends thereof and dividing said chamber into a heating zone thereabove and a combustion zone therebelow, a pebble outlet conduit extending downwardly from a lower portion of said conical gas distribution member, at least one gas inlet conduit in communication with said combustion zone, and the perforate portion of said perforate gas distribution member comprising a plurality of passageways slanting inwardly and downwardly in communication with said heating zone.

8. In a pebble heating apparatus utilizing a moving bed of heated pebbles, an improved heating chamber comprising a substantially vertically disposed outer shell, effluent gas outlet means in the upper portion of said chamber, pebble inlet means in the upper portion of said chamber, a perforate inverted conical member transversely closing said chamber intermediate the ends thereof and dividing said chamber into a heating zone thereabove and a combustion zone therebelow, the perforate portion of said perforate member comprising a plurality of gas passageways slanting inwardly and downwardly in communication with said heating zone, a pebble outlet conduit extending downwardly from a lower portion of said conical member, and gas inlet means to said combustion zone.

9. In a pebble heating apparatus utilizing a moving bed of heated pebbles, an improved heating chamber comprising a substantially vertically disposed closed outer shell, an effluent gas outlet conduit axially positioned in the top closure member of said chamber, a plurality of pebble inlet conduits concentrically positioned about the top closure member of said chamber and extending therethrough into said chamber, a perforate convex conical member axially positioned in said chamber within an imaginary circle described by the locus of said plurality of pebble inlet conduits extending into said chamber, said conical member being spaced from the top closure member thereof at a sufficient distance to permit the passage of gas therebetween, adjustable closure means attached to regulate the perforate area of said conical member, pebble outlet means in communication with pebbles in said chamber, and gas inlet means to said pebbles.

SAM P. ROBINSON.
LOUIS C. BEARER.

REFERENCES CITED

The following references are of record in the file of this patent:

UNITED STATES PATENTS

| Number | Name | Date |
| --- | --- | --- |
| 2,121,733 | Cottrell | June 21, 1938 |
| 2,345,067 | Osann | Mar. 28, 1944 |